US011199178B2

(12) United States Patent
Jensen et al.

(10) Patent No.: US 11,199,178 B2
(45) Date of Patent: Dec. 14, 2021

(54) MULTIROTOR WIND TURBINE WITH A PLATFORM

(71) Applicant: Vestas Wind Systems A/S, Aarhus N. (DK)

(72) Inventors: Ivar J. B. K. Jensen, Hornslet (DK); Gunnar K. Storgaard Pedersen, Skjern (DK)

(73) Assignee: Vestas Wind Systems A/S, Aarhus N. (DK)

( * ) Notice: Subject to any disclaimer, the term of this patent is extended or adjusted under 35 U.S.C. 154(b) by 484 days.

(21) Appl. No.: 16/090,645

(22) PCT Filed: Apr. 4, 2017

(86) PCT No.: PCT/DK2017/050105
§ 371 (c)(1),
(2) Date: Oct. 2, 2018

(87) PCT Pub. No.: WO2017/178026
PCT Pub. Date: Oct. 19, 2017

(65) Prior Publication Data
US 2020/0408195 A1    Dec. 31, 2020

(30) Foreign Application Priority Data

Apr. 15, 2016    (DK) .......................... PA 2016 70234

(51) Int. Cl.
*F03D 80/50*    (2016.01)
*F03D 13/20*    (2016.01)
(Continued)

(52) U.S. Cl.
CPC .............. *F03D 80/50* (2016.05); *F03D 1/02* (2013.01); *F03D 7/0212* (2013.01); *F03D 13/20* (2016.05);
(Continued)

(58) Field of Classification Search
CPC .................................................. F05B 2240/37
See application file for complete search history.

(56) References Cited

U.S. PATENT DOCUMENTS 7,296,974 B2 *   11/2007   Wobben .................. F03D 13/25
                                                  416/132 B
2003/0168864 A1   9/2003    Heronemus et al.
(Continued)

FOREIGN PATENT DOCUMENTS

CN          2274261 Y      2/1998
CN         102322400 A     1/2012
(Continued)

OTHER PUBLICATIONS

European Patent Office, International Search Report and Written Opinion in PCT Application No. PCT/DK2017/050105, dated Jul. 3, 2017.
(Continued)

*Primary Examiner* — Michael Lebentritt
*Assistant Examiner* — Jason G Davis
(74) *Attorney, Agent, or Firm* — Wood Herron & Evans LLP

(57) ABSTRACT

A multirotor wind turbine comprising a tower, a suspension arm, a nacelle, and a rotor carried by the nacelle and configured to rotate about a rotor axis to drive a drive train in the nacelle, wherein the tower holds the suspension arm, and the suspension arm holds the nacelle. To facilitate safer and better access to the nacelle or drive train, the suspension arm is configured as a platform to provide support for personnel e.g. during maintenance and repair of the nacelle.

19 Claims, 4 Drawing Sheets

(51) Int. Cl.
    *F03D 1/02*     (2006.01)
    *F03D 7/02*     (2006.01)
(52) U.S. Cl.
    CPC .......... *F05B 2240/37* (2020.08); *Y02E 10/72* (2013.01); *Y02E 10/728* (2013.01)

(56) References Cited

U.S. PATENT DOCUMENTS

| | | | | |
|---|---|---|---|---|
| 2007/0243063 | A1* | 10/2007 | Schellstede | F03D 13/10 416/10 |
| 2010/0143131 | A1* | 6/2010 | Pitre | F03D 1/0658 416/85 |
| 2013/0127173 | A1 | 5/2013 | Lee et al. | |
| 2015/0292488 | A1 | 10/2015 | Wepfer | |

FOREIGN PATENT DOCUMENTS

| | | |
|---|---|---|
| DE | 102012020052 B3 | 4/2014 |
| GB | 2443886 A | 5/2008 |
| WO | 2007009464 A1 | 1/2007 |
| WO | 2010098813 A1 | 9/2010 |
| WO | 2016128002 A1 | 8/2016 |

OTHER PUBLICATIONS

Danish Patent and Trademark Office, Examination Report in PA 2016 70234, dated Nov. 11, 2016.
China National Intellectual Property Administration, First Notification of Office Action in CN Application No. 201780034261.7, dated Nov. 14, 2019.

\* cited by examiner

MULTIROTOR WIND TURBINE WITH A PLATFORM

INTRODUCTION

The invention relates to a multirotor wind turbine comprising a tower, a suspension arm, a nacelle, and a rotor carried by the nacelle. The rotor is configured to rotate about a rotor axis to drive a drive train in the nacelle. The tower holds the suspension arm, and the suspension arm holds the nacelle.

BACKGROUND OF THE INVENTION

Wind turbines normally comprise a rotor with blades and arranged to rotate by wind energy. The rotor drives a drive train which typically includes a generator which converts the energy to electricity. The drive train may include a gearbox, or the generator may be directly driven by the rotor.

The drive train is housed in a nacelle which is typically rotationally attached to a tower. Herein, the rotor with blades, the drive train, and the nacelle are referred to as an energy generating unit.

In a traditional horizontal axis wind turbine, the energy generating unit is placed on top of the vertical tower carried by a bearing allowing the energy generating unit to rotate in a horizontal plane to thereby face the direction of the wind. Access to the interior of the nacelle for inspection and maintenance is through the interior of the tower.

In multirotor wind turbines, several energy generating units are carried by the same tower structure. The tower structure typically combines one or more vertical towers with one or more suspension arms extending at an angle from the tower and holding at least one energy generating unit.

Due to the location of the energy generating units on suspension arms, entrance into the nacelle directly from the tower is typically not an option for multirotor wind turbines.

DESCRIPTION OF THE INVENTION

It is an object of embodiments of the invention to facilitate maintenance and inspection of the energy generating unit of a multirotor wind turbine.

According to a first aspect, the invention provides a multirotor wind turbine comprising a tower, a suspension arm, a nacelle, and a rotor carried by the nacelle and configured to rotate about a rotor axis to drive a drive train in the nacelle, wherein the tower holds the suspension arm, and the suspension arm holds the nacelle, and wherein the suspension arm is configured as a platform to provide support for personnel during maintenance and repair of the nacelle.

Since the suspension arm forms a platform from which inspection and maintenance can be carried out, the personnel is supported with increased work space very close to the energy generating unit.

In the present context the term 'platform' should be interpreted to mean an area suitable for carrying the personnel, i.e. suitable for the personnel to stay during inspection and maintenance, e.g. a plane or essentially plane area, e.g. of a size of at least 1 square meter.

In the present context the term 'multirotor wind turbine' should be interpreted to mean a wind turbine comprising two or more energy generating units mounted on one tower structure. The tower structure comprises a tower carrying one or more suspension arms. Each suspension arm extends outwards from a tower and carries at least one energy generating unit. The angle between the suspension arms and the tower may be fixed or it may be variable, e.g. for the purpose of changing the height of the energy generating unit with respect to ground, e.g. for maintenance purpose, or for protection against strong wind etc.

The energy generating units may be arranged at or near the ends of the suspension arm, i.e. furthest away from the tower which holds the suspension arm.

When the tower structure comprises two suspension arms, the arms may extend in opposite directions away from the tower. The arms may have different angles to the tower or they may have the same angle to the tower. The angles individually or generally may e.g. be in the range between 10-90 degrees relative to a vertical tower, e.g. 20-90 or 30-90 or 40-90 degrees. In one embodiment, at least two suspension arms extend in an upwards direction of e.g. 5-45 degrees from horizontal and optionally such that two other arms extends in a downwards direction of minus 5-45 degrees from horizontal.

Each suspension arm may be attached to the tower via a yaw arrangement whereby the suspension arm is allowed to perform yawing movements with respect to the tower which holds the suspension arm. This will allow the rotors of the energy generating units to be directed against the wind direction.

In the present context the term 'energy generating unit' should be interpreted as a nacelle, a rotor with blades, and a drive train including a shaft connecting the rotor to a generator, and optionally also including a gearbox between the rotor and the generator. Parts of the drive train are typically inside the nacelle.

In the present context, the term 'tower' should be interpreted to mean a substantially vertical structure, arranged to carry the energy generating units of the multirotor wind turbine, at least partly via one or more suspension arms. It is not ruled out that one or more energy generating units are mounted directly on the tower structure. The tower may comprise a number of tower segments, which are assembled to form the tower structure. The tower segments may be assembled in a reversible manner, e.g. using screws or bolts, or in an irreversible manner, such as by means of welding or the like. As an alternative, the tower structure may be made from concrete, and may be reinforced e.g. by fibres, rods, or wires.

A single tower may carry one, two, or more suspension arms. Each suspension arm may be supported by one or more guy wires, e.g. connected between the free ends of two suspension arms which extend in opposite directions from the tower.

The platform may be positioned very close to the nacelle and/or close to the rotor. Particularly, it may be positioned sufficiently close to enable the personnel to reach the drive train and rotor components directly when positioned on the platform. The platform may be directly against the nacelle such that the personnel can walk directly back and fourth between the platform and the interior of the nacelle.

In one embodiment, a movable part of the energy generating unit, e.g. the entire energy generating unit, or at least a component thereof, e.g. the nacelle and/or the rotor and/or at least one blade of the rotor, is configured to move relative to the suspension arm between an operation position where the rotor is free to rotate about the rotor axis and a maintenance position where at least that movable part is closer to the platform than in the operation position. The distance may e.g. become less than half of the initial distance.

For enabling this movement, the wind turbine may include at least one link providing a degree of freedom between the suspension arm and the movable part of the energy generating unit. The at least one degree of freedom could be provided e.g. by a rotational joint allowing rotation of the movable part relative to the suspension arm and/or a translatoric joint allowing translatoric movement, e.g. linear movement between the suspension arm and the movable part of the energy generating unit.

In one embodiment, the wind turbine includes two or more individually movable parts. In this embodiment, the nacelle may be movable relative to the suspension arm, and the rotor may be movable relative to the nacelle and thus relative to the suspension arm. The wind turbine thus includes two links each providing one degree of freedom. One or both links could be translatoric and/or rotational. By translatoric is particularly meant a joint facilitating that all point on the moving element moves with same speed in the same direction, this could e.g. be provided by a linear joint.

For conducting service and inspection of blades of the rotor, the movable part may particularly be movable to a position where at least one of the blades are directly adjacent the suspension arm or where at least one of the blades intersects the suspension arm such that rotation of the rotor would cause collision between the blade and the suspension arm. In this way, the personnel can stand on the platform and work on the blade. Accordingly, the at least one degree of freedom mentioned above, may particularly provide sufficient movability to move the movable part of the energy generating unit to a position where a blade extends over the platform.

When conducting maintenance on the wind turbine, it is for security reasons typically desired to prevent rotation of the rotor and drive train. For this reason, most wind turbines comprise a brake which operates on the drive train, e.g. via a gearbox. The degree of freedom between the suspension arm and the movable part of the energy generating unit may be configured to move the movable part of the energy generating unit into a maintenance position where the rotor is prevented from rotating about the rotor axis.

In one implementation, the rotor may simply be prevented from rotating by contact between one of the blades and the suspension arm. In other embodiments, the rotor and/or the suspension arm is configured with separate interacting parts which lock the rotation of the rotor in the maintenance position. In one embodiment, the rotor is locked by a locking structure which is activated to lock by the movement of the movable part to the maintenance position. In one embodiment, the rotor is locked by a locking structure which is de-activated to unlock by the movement of the movable part to the operation position.

The rotor axis may be essentially parallel with the platform when the movable part of the energy generating unit is in the maintenance position.

The nacelle may comprise a wall panel which can open towards the suspension arm such that the personnel can enter the nacelle through the open panel or such that they can work on internal components of the nacelle directly from the platform.

At least one of the suspension arm and nacelle may comprise a boarding bridge forming a movable connector between the platform and the nacelle. The boarding bridge may e.g. be formed by a panel of the nacelle which can pivot down and form a boarding bridge which interconnects the floor of the nacelle with the platform formed by the suspension arm.

The boarding bridge may be configured to allow personnel to board and disembark the nacelle sheltered. For that purpose, the boarding bridge may form an enclosed movable connector, e.g. comprising an elastically or bellow shaped rubber enclosure.

The platform may be formed by an upper surface of the suspension arm. The upper surface may form a first portion extending at a first angle relative to the tower, and a second portion extending at a second angle different from the first angel relative to the tower. The second portion may particularly be horizontal or at least closer to horizontal than the first portion of upper surface of the suspension arm. Both portions may form a platform, but the second portion which is more horizontal may be particularly suitable when working on the energy generating unit.

The suspension arm may form an access structure for passage of personnel and spare parts from the tower to the platform. Particularly, the passage may form an extension of a passage inside the tower from an opening in the bottom of the tower to an opening where the suspension arm joins the tower. The passage and/or the platform may be sheltered by a cover to protect the personnel against bad weather.

The platform may be configured with lifting gear for lifting spare parts or personnel from ground, and it may further be configured with safety features such as a safety net etc.

The platform may comprise expandable section being movable relative to a fixed section in a direction towards a rotation plane formed by blades of the rotor. In this case, the expandable section constitutes or at least partly constitutes the movable part of the energy generating unit. The expandable section may e.g. be fixed to the suspension arm via a linear joint and movement may be initiated by power driven means, e.g. a hydraulic or electric actuator.

The expandable section may be movable between a contracted position at a first distance to the rotation plane and an expanded position at a second distance to the rotation plane. The second distance may be less than half, or less than a quarter of the first distance. In one embodiment, the expandable section is movable past the rotation plane such that rotation of the rotor is prevented when the expandable section is in the expanded position. This will allow maintenance on the windward side of the blades, and maintenance on the spinner etc.

At least one hinged blade of the rotor may be configured to move relative to the remaining parts of the rotor between an operation position where the rotor is free to rotate about the rotor axis and a maintenance position where the hinged blade is closer to the platform than in the operation position. In this case, the hinged blade constitutes or at least partly constitutes the movable part of the energy generating unit.

The hinged blade may extend across the suspension arm in the maintenance position.

In a second aspect, the invention provides a method of providing access to an energy generating unit in a multirotor wind turbine. The method relates to a multirotor wind turbine comprising a tower, a suspension arm, a nacelle, and a rotor carried by the nacelle and configured to rotate about a rotor axis to drive a generator in the nacelle. The tower holds the suspension arm, and the suspension arm holds the nacelle with the rotor. According to the method, the suspension arm is used as a platform for personnel during access to the energy generating unit, e.g. during maintenance and repair of the nacelle, drive train, or rotor.

The method may comprise the step of moving a movable part of the energy generating unit towards the suspension arm prior to its use as a platform. This step may e.g. include moving the rotor relative to the nacelle to a position closer to the platform or it may include moving the nacelle including the rotor to a position closer to the platform.

The method may comprise the step of connecting the platform and the nacelle with a boarding bridge e.g. allowing the personnel to enter the nacelle directly from the platform and enable personnel to walk back and fourth between the platform and the nacelle. The step of connecting the platform and the nacelle may e.g. include the step of opening a panel of the nacelle to thereby create passage from the platform to the internal components inside the nacelle. The method may include folding the panel down to thereby form a connection between the platform and the nacelle by use of that panel.

The method may include the step of moving the movable part of the energy generating unit to a position in which the rotor is prevented from rotating about the rotor axis. Particularly, the method may include the step of moving the rotor to a position where rotation of the rotor would cause collision between the blades and the suspension arm.

Particularly, the method may include working on one or more of the wind turbine blades from the platform. Accordingly, the method may particularly include the step of moving the movable part to a position where at least one of the blades are adjacent to or intersects the suspension arm, i.e. is in a position where rotation is prevented by the suspension arm.

BRIEF DESCRIPTION OF THE DRAWINGS

The invention will now be described in further detail with reference to the accompanying drawings in which.

DETAILED DESCRIPTION OF THE DRAWINGS

It should be understood that the detailed description and specific examples, while indicating embodiments of the invention, are given by way of illustration only, since various changes and modifications within the spirit and scope of the invention will become apparent to those skilled in the art from this detailed description.

Figure 1:
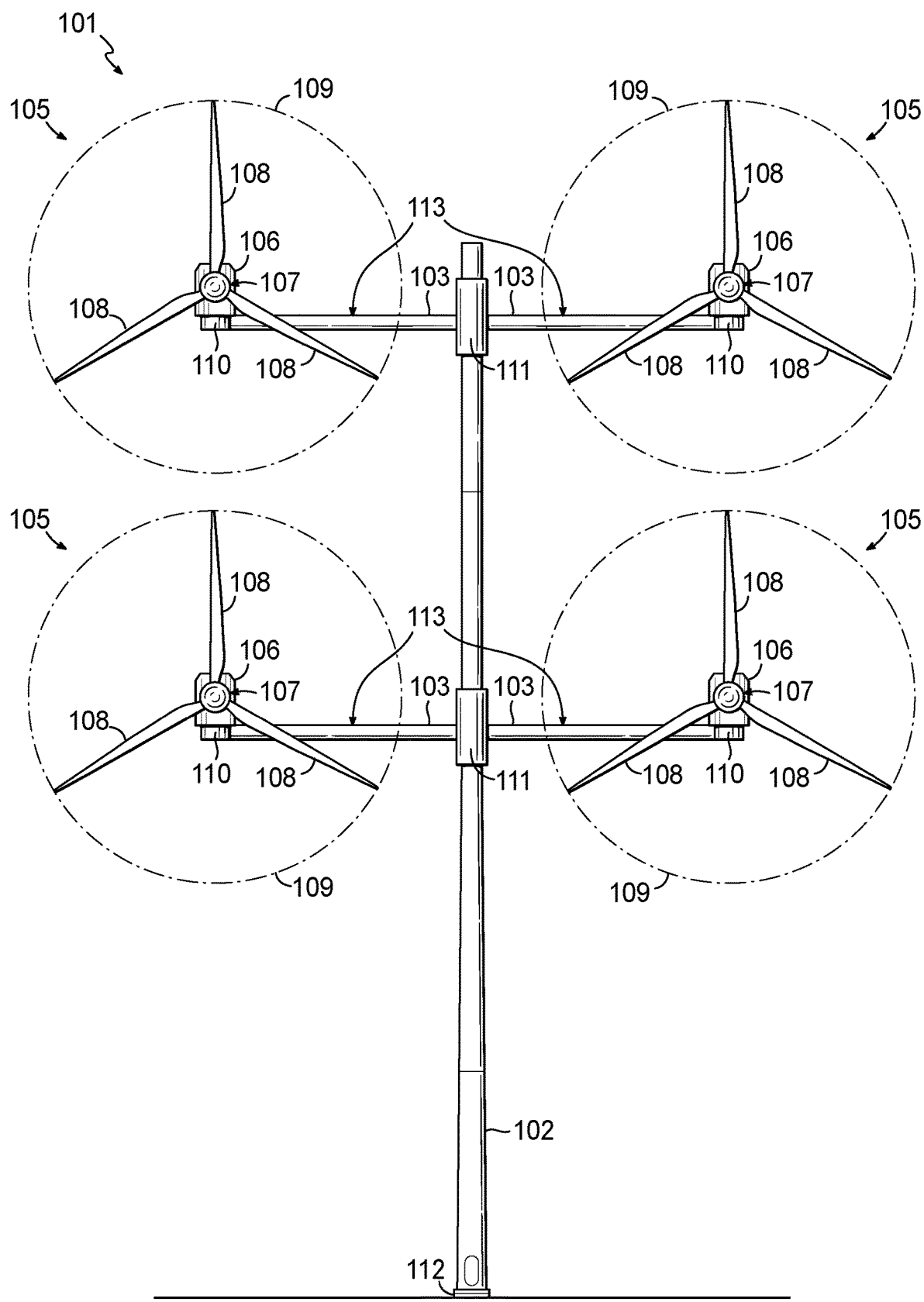
FIG. 1 is a front view of a multirotor wind turbine comprising two suspension arms according to an embodiment of the invention.

FIG. 1 is a front view of a multirotor wind turbine 101 comprising a tower 102 carrying four suspension arms 103. The suspension arms 103 are arranged, in pairs of two, one pair above the other.

The suspension arms in a pair of suspension arms extend in opposite directions away from the tower 102.

Each suspension arm 103 supports an energy generating unit 105. And each energy generating unit 105 comprises a nacelle 106 and a rotor 107 carrying three wind turbine blades 108, sweeping an area 109. Each energy generating unit 105 is connected to a suspension arm via a rotational joint 110.

The suspension arms 103 are attached to the tower 2 via a yaw arrangement 111, allowing the entire suspension arm 103 to perform yawing movements with respect to the tower 102 in order to direct the rotors 107 into the incoming wind.

When the multirotor wind turbine 101 is operational, the energy generating units 105 are placed symmetrically around the tower 102 so that the multirotor wind turbine is balanced.

For maintenance and inspection, the personnel enter the tower via the opening 112 at the base of the tower and access to each energy generating unit is provided inside the tower and inside the corresponding suspension arm. Additionally, each suspension arm forms a platform from which personnel can work during maintenance and repair of the nacelle.

FIG. 1 illustrates the suspension arms forming the plane platforms 113. The platforms may include rails and other safety features for protecting the personnel. Further, the suspension arms may be constituted by a lattice structure or by a hollow tubular element, and in this case, the platform may be formed internally in the suspension arm.

Figure 3A:
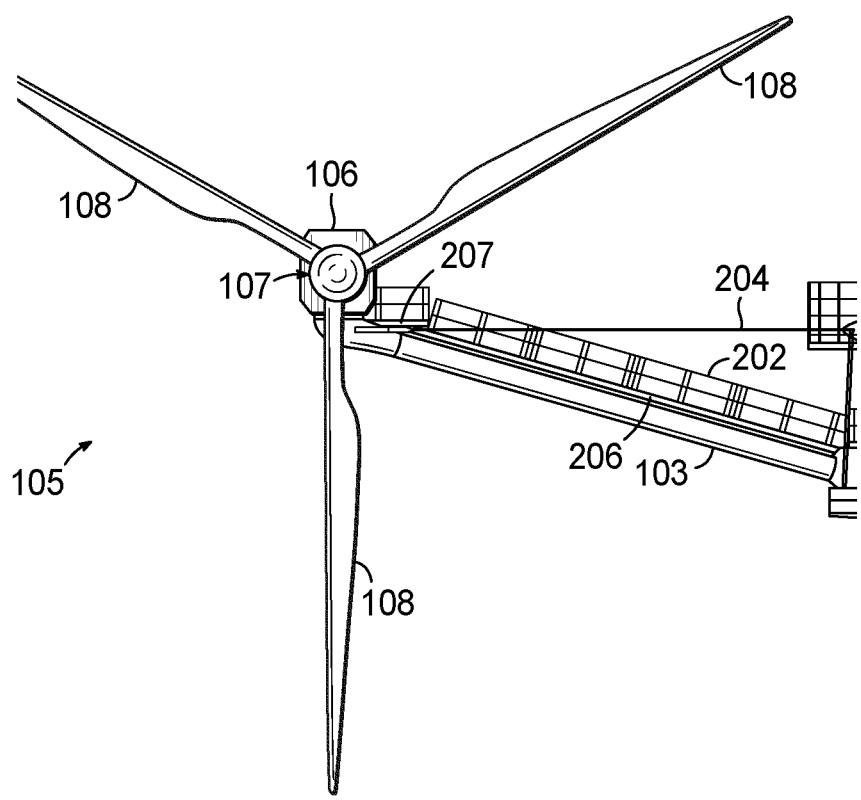
Figure 3B:
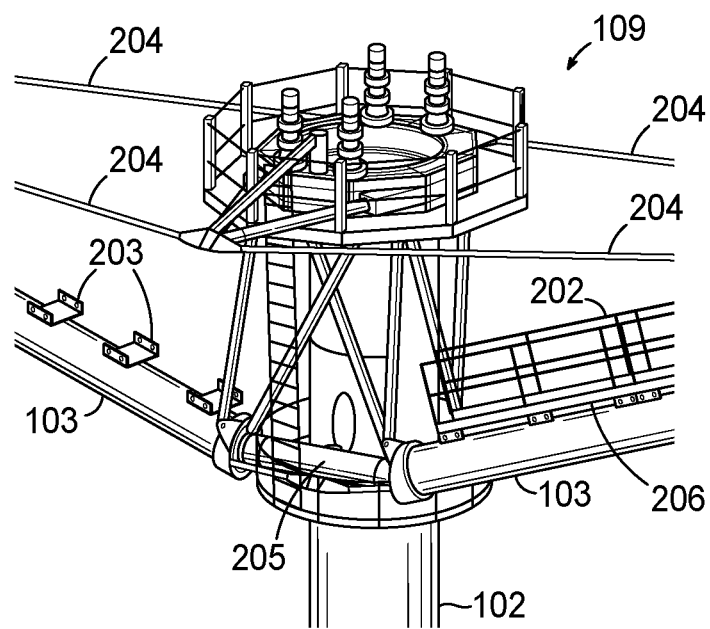

The platform formed by each suspension arm is shown in further details in FIGS. 3a and 3b.

Figure 2:
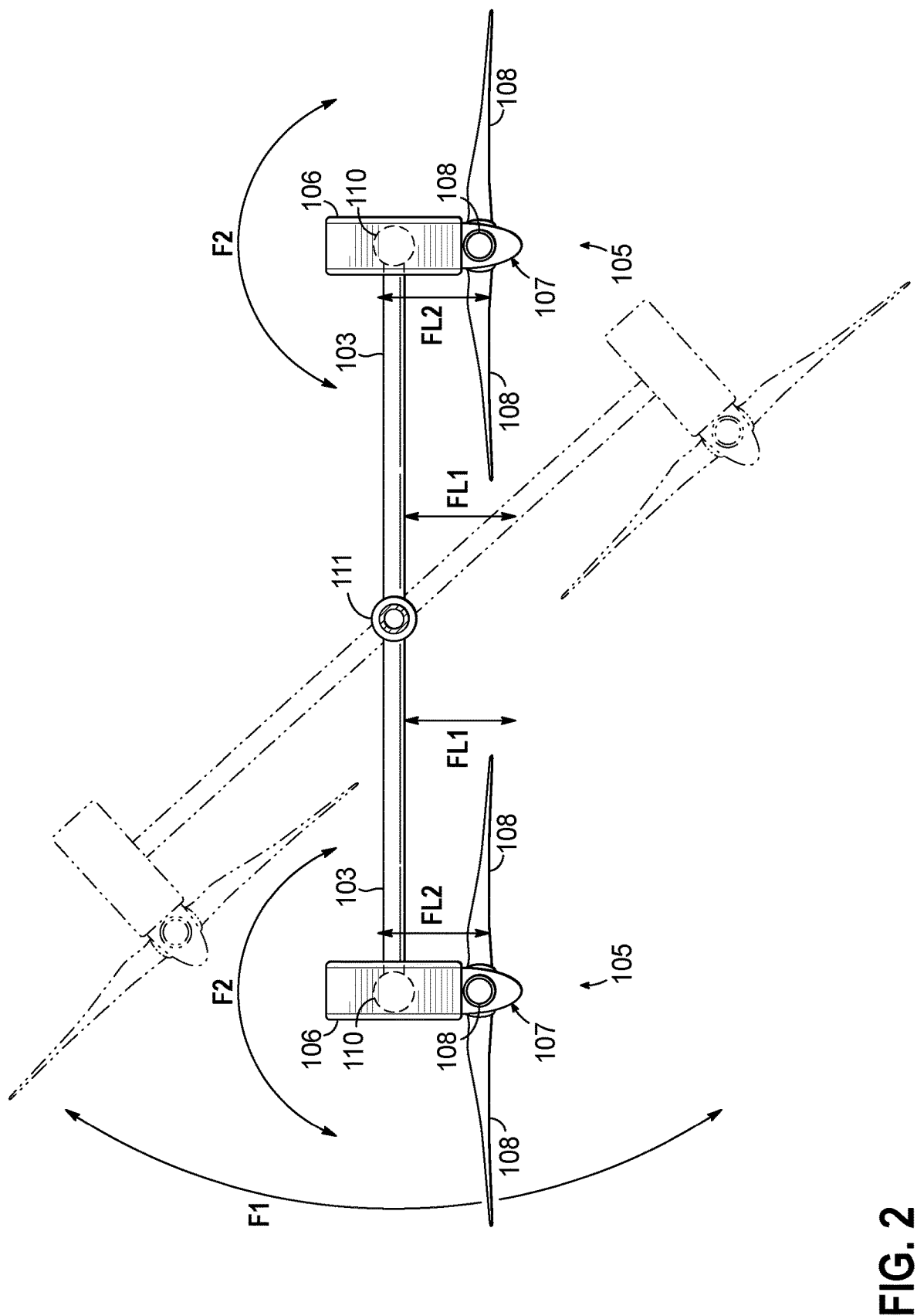
FIG. 2 is a side view of the multirotor wind turbine of FIG. 1, FIGS. 3a and 3b illustrate the platform formed by the suspension arm in further details.

FIG. 2 illustrates the wind turbine seen from above. This illustrates a double rotation feature allowing both a yaw rotation of the entire suspension arm with the energy generating unit by use of the yaw arrangement 111 and rotation of each energy generating unit relative to the suspension arm by use of the rotational joint 110. The first rotational freedom provided by the yaw arrangement is indicated by F1 and the second rotational freedom provided by the rotational joint 110 is indicated by F2.

The illustrated double rotation feature thereby provides a movable part of the energy generating unit, in this case the entire nacelle with rotor and drivetrain, and allows the nacelle and/or the rotor to be moved to a maintenance position where it can more easily be reached from the platform formed by the suspension arm.

FIG. 2 further illustrates two different linear joints providing the translatoric freedom indicated by FL1 and FL2. FL 1 and FL2 can be included separately, one or the other, or in combination, one and the other. The illustrated tranlatoric feature provides a part of the energy generating unit which is movable relative to the suspension arm, in this case FL1 allows movement of an expandable section of the platform to and from the rotor plane formed by the blades, and FL2 indicates linear movement of the entire nacelle with rotor and drivetrain in a direction perpendicular to the suspension arm and thereby to and from a position where the blades can be reached from the platform formed by the suspension arm.

Each suspension arm 103 forms a platform 112 from which personnel can work during maintenance and repair of the nacelle. In the embodiment of FIGS. 3a and 3b, one of the suspension arms is fitted with a rail structure 113 protecting the personnel on the platform.

FIGS. 3a and 3b illustrate details of the yaw arrangement 111 and suspension arms, and particularly details of the platform.

In FIG. 3a, the suspension arm 103 having an upper surface forming a platform 206, 207 with a hand rail 202 protecting the personnel who works on the energy generating unit. The guy wires 204 supports the suspension arms and may further be used for attachment of a safety net under the platform.

A first portion 206 of an upper surface of the suspension arm extends at a first angle relative to the tower, and a second portion 207 of an upper surface of the suspension arm extends at a second angle different from the first angel relative to the tower. The second portion of the upper surface is horizontal and thereby further facilitates the ability to work from the platform.

FIG. 3b illustrates a wind turbine where the left side suspension arm is under construction and the right side suspension arm is finished. In this view, it is illustrated that the platform and handrail are attached to the suspension arm via the attachment fixtures 203 fixed directly to the arm.

The personnel doing maintenance may exit the tower to reach the suspension arm via the hatch 205.

Figure 4:
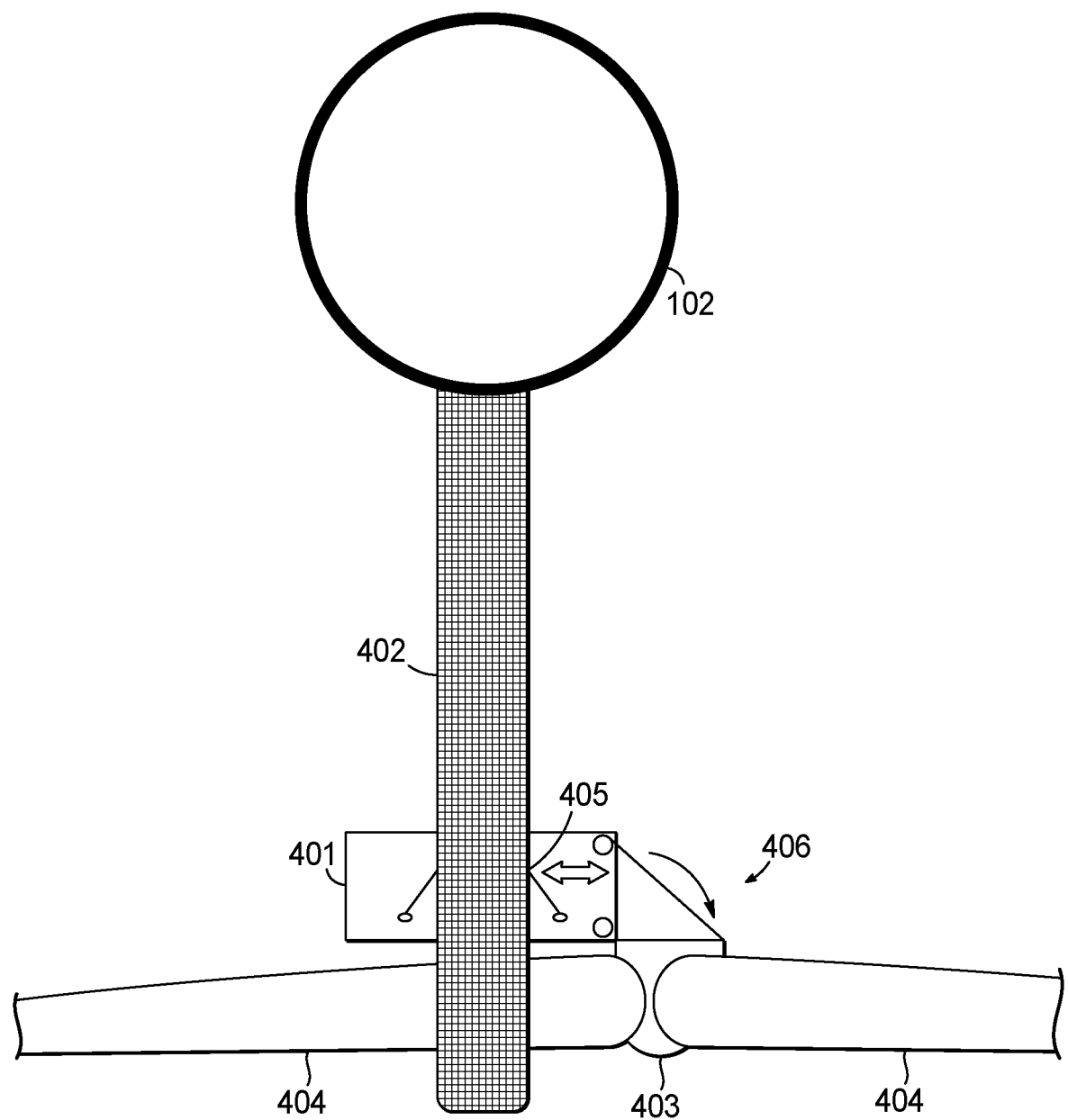
FIG. 4 is a schematic illustration of the movement of the rotor relative to the nacelle for bringing the rotor closer to the platform.

FIG. 4 illustrates schematically that the energy generating unit may comprise a movable part which can be moved to a maintenance position which is closer to the platform than a normal operational position of the movable part. The movable part could be the entire energy generating unit or, as shown in this embodiment, several components of the energy generating unit. In this example, the nacelle 401 is movable relative to the platform 402. To further facilitate work on the energy generating unit, the rotor 403, including the blades 404 are also movable relative to the nacelle 401 and thus movable relative to the platform 402.

For enabling this movement, the wind turbine has two degrees of freedom between the suspension arm and the movable parts of the energy generating unit. One of these degrees of freedom is constituted by the translatoric joint 405 between the nacelle and the platform, and the other one of these degrees of freedom is constituted by the rotational joint 406 between the nacelle and the rotor.

The invention claimed is:

1. A multirotor wind turbine. comprising:
   a tower,
   a suspension arm,
   a nacelle, and
   a rotor carried by the nacelle and configured to rotate about a rotor axis to drive a drive train in the nacelle,
   wherein the tower holds the suspension arm, and the suspension arm holds the nacelle, and wherein the suspension arm forms a platform to provide support for personnel for access to the nacelle or rotor, and
   wherein at least one of the nacelle and the rotor is configured to move relative to the suspension arm between an operation position where the rotor is free to rotate about the rotor axis and a maintenance position where at least one of the rotor and nacelle is closer to the platform than in the operation position.

2. The wind turbine according to claim 1, wherein the rotor is prevented from rotating about the rotor axis in the maintenance position.

3. The wind turbine according to claim 2, where blades of the rotor extend across the suspension arm in the maintenance position.

4. The wind turbine according to claim 2, where a hinged blade extends across the suspension arm in the maintenance position.

5. The wind turbine according to claim 1, wherein the rotor axis is essentially parallel with the platform in the maintenance position.

6. The wind turbine according to claim 1, wherein the nacelle comprises a wall panel which can open towards the suspension arm.

7. The wind turbine according to claim 1, wherein at least one of the suspension arm and nacelle comprises a boarding bridge forming a movable connector between the platform and the nacelle.

8. The wind turbine according to claim 7, wherein the boarding bridge is configured to allow personnel to board and disembark the nacelle sheltered.

9. The wind turbine according to claim 1, wherein a first portion of the platform extends at a first angle relative to the tower, and a second portion of the platform extends at a second angle different from the first angle relative to the tower.

10. The wind turbine according to claim 9, wherein the second portion is horizontal.

11. The wind turbine according to claim 1, wherein the suspension arm forms an access structure for passage of personnel and spare parts from the tower to the platform.

12. The wind turbine according to claim 1, comprising a plurality of suspension arms each holding a nacelle and rotor.

13. The wind turbine according to claim 1, wherein the platform comprises an expandable section being movable relative to a fixed section in a direction towards a rotation plane formed by blades of the rotor.

14. The wind turbine according to claim 13, wherein the expandable section is movable between a contracted position at a first distance to the rotation plane and an expanded position at a second distance to the rotation plane.

15. The wind turbine according to claim 14, wherein the second distance is less than half of the first distance.

16. The wind turbine according to claim 1, wherein at least one hinged blade of the rotor is configured to move relative to the nacelle between the operation position where the rotor is free to rotate about the rotor axis and the maintenance position where the hinged blade is closer to the platform than in the operation position.

17. A method of providing access to an energy generating unit in a multirotor wind turbine, the method comprising:
   providing the multirotor wind turbine according to claim 1;
   moving at least one of the nacelle and the rotor towards the suspension arm; and
   accessing the energy generating unit by personnel using the platform of the suspension arm.

18. The method according to claim 17, further comprising preventing the rotor from rotating about the rotor axis when the nacelle or rotor is moved towards the suspension arm.

19. The method according to claim 17, wherein accessing the energy generating unit further comprises accessing a blade of the wind turbine rotor from the platform.

* * * * *